United States Patent [19]

Hideshima et al.

[11] 4,339,794

[45] Jul. 13, 1982

[54] METHOD AND SYSTEM FOR CONTROLLING INPUT/OUTPUT IN PROCESS CONTROL

[75] Inventors: Keiji Hideshima, Fujisawa; Haruo Koyanagi, Ome; Shuichi Senda; Kazuyoshi Asada, both of Hitachi; Norio Murayama, Katsuta; Yoshiyuki Nihashi; Masaoki Takaki, both of Hitachi, all of Japan

[73] Assignees: Hitachi, Ltd.; Nissan Motor Co, Ltd., both of Tokyo, Japan

[21] Appl. No.: 75,152

[22] Filed: Sep. 12, 1979

[30] Foreign Application Priority Data

Sep. 13, 1978 [JP] Japan ................. 53-111664

[51] Int. Cl.³ .................... G06F 3/00; G05B 11/01
[52] U.S. Cl. ..................... 364/200; 364/141
[58] Field of Search ... 364/200 MS File, 900 MS File, 364/104, 103

[56] References Cited

U.S. PATENT DOCUMENTS

| | | | |
|---|---|---|---|
| 3,430,209 | 2/1969 | Goshorn et al. | 364/200 |
| 3,827,030 | 7/1974 | Seipp | 364/900 |
| 4,129,901 | 12/1978 | Masuda | 364/900 X |
| 4,153,942 | 5/1979 | Gregory | 364/900 |
| 4,172,280 | 10/1979 | Spiesman | 364/900 X |

FOREIGN PATENT DOCUMENTS 52-122786 10/1977 Japan .

Primary Examiner—Raulfe B. Zache
Attorney, Agent, or Firm—Craig and Antonelli

[57] ABSTRACT

Novel method and system for controlling input/output in a process control wherein state signals of object processes to be controlled are applied to a CPU via a process input/output unit and operated in the CPU in accordance with a logic programmed and stored in advance, and results of the operation are delivered out to the object processes to control the same. A buffer memory is interposed between the CPU and the process input/output unit. While reception and delivery of data are performed between the CPU or processor unit and the buffer memory, fetching of the state signals of the object processes or delivery of the process controlling signals is performed between the buffer memory and the object processes, thereby attaining a high rate processing as viewed from the overall processing of the system.

12 Claims, 4 Drawing Figures

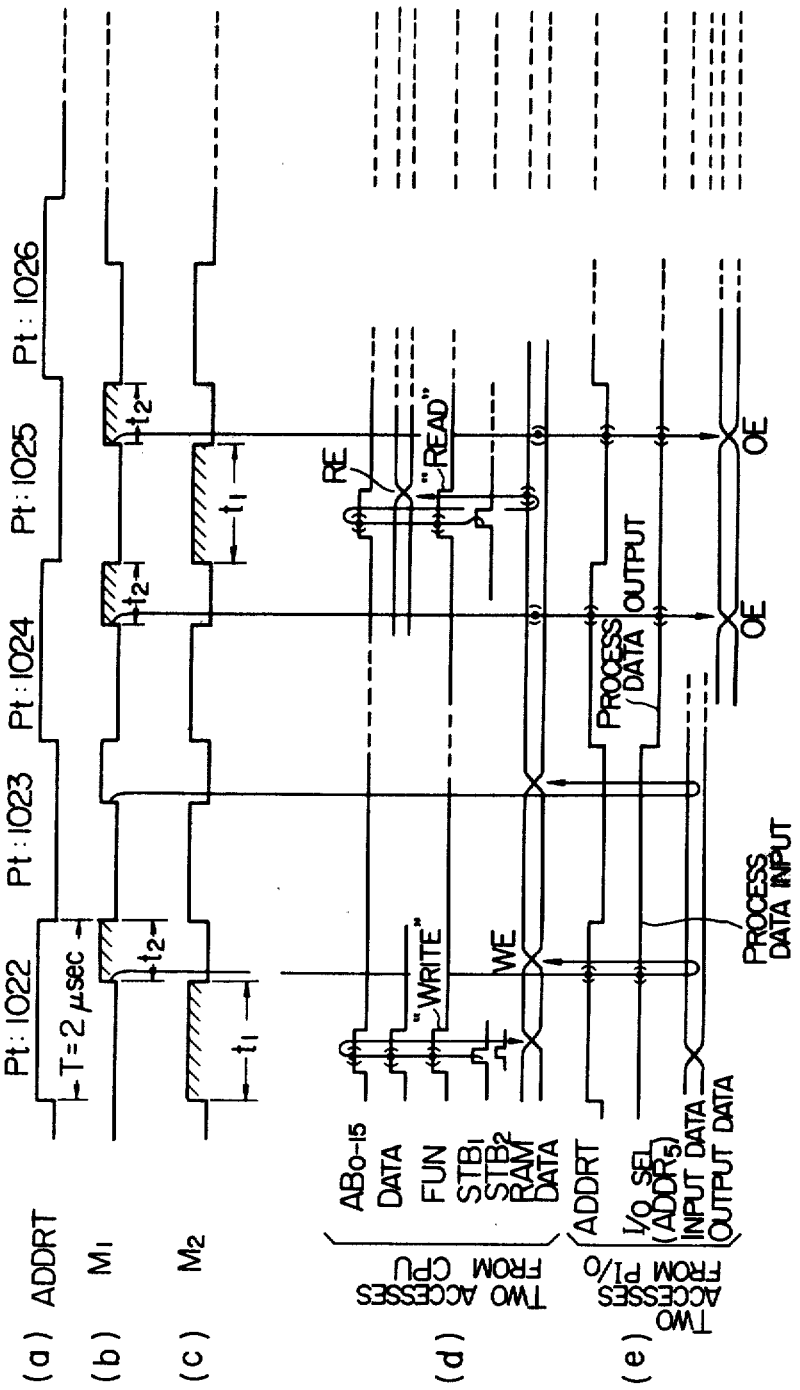

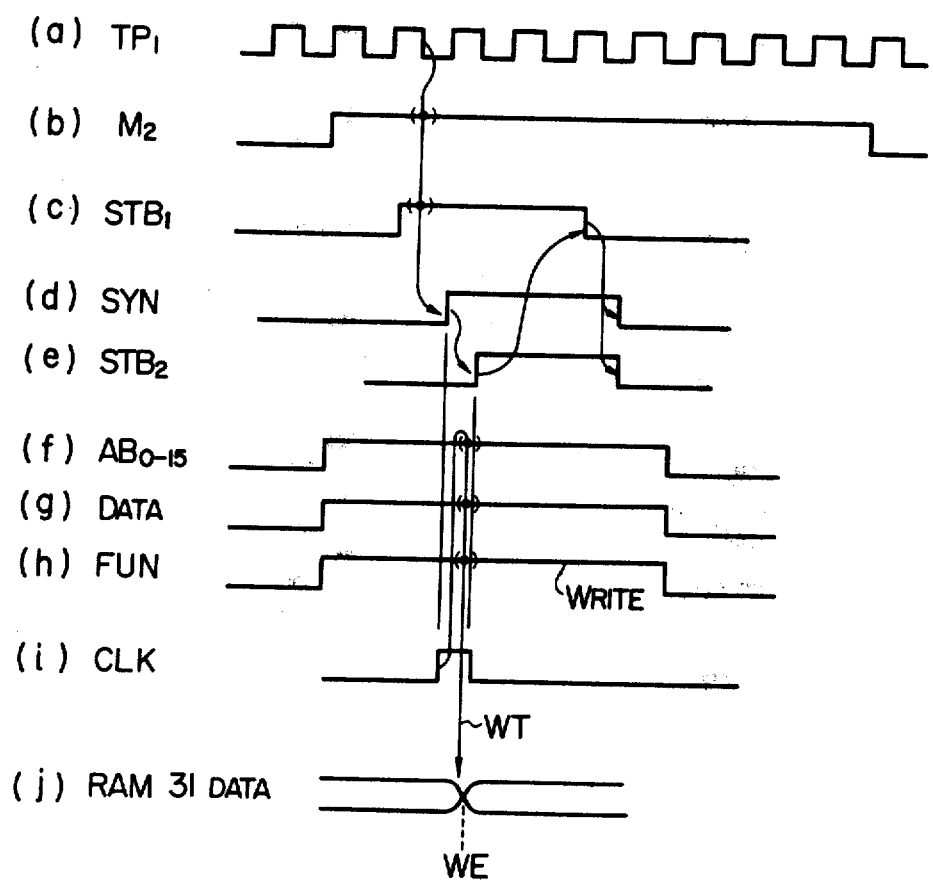

METHOD AND SYSTEM FOR CONTROLLING INPUT/OUTPUT IN PROCESS CONTROL

This invention relates to method and system for controlling input/output operations in a process control such as by a programmable logic controller (hereinafter simply referred to as PLC) which is operated in accordance with a sequence programmed and stored in advance.

With the PLC, for example, an operation is effected on the basis of an input signal fetched by a process input/output unit (hereinafter simply referred to as P I/O) and the result of this operation is delivered through the P I/O to an object process to be controlled for controlling the same. As far as the PLC is concerned, it is a matter of significance to discuss how the response of a processor unit in the PLC can be improved. Thus, discussed herein are method and system for controlling input/output in a process control wherein the input/output signal is connected to other units by means of a memory interface and processed at a high rate.

In the case of the PLC, it is general to connect a programming unit, a memory unit, an operation processor unit and a P I/O by way of bus lines. For the sake of processing data, the processor unit first fetches the data from an object process or the process which is made an object of control through the P I/O and then performs an actual processing. There is also available a system wherein when the processor unit selects an input point by way of the P I/O, an answerback signal indicating that data regarding the selected input point is ready for being read out is first returned to the processor unit and thereafter, an actual data fetching is performed. With this system, since it takes an appreciable time for fetching the data or for delivering out data relating to the operation result, high rate operation, as reckoned throughout the system, is inevitably impaired even if a high rate processor unit is used. Thus, the merit which would otherwise be brought about by the element having the high rate processing function is greatly degraded. For example, it sometimes takes 100 μsec to 1.5 msec for operating and processing one control instruction.

As prior art which comes most close to the present invention, one may refer to Japanese Patent Laid-open Publication No. 122786/1977 issued on Oct. 15, 1977 and entitled "Sequence Control System". Disclosed therein is a sequence control system suitable for controlling a plurality of objects to be subjected to the same control. This control system intends to make repeated use of the program parts by using an instruction which is adapted to change the address of an input/output unit and which is contained in the control instruction and save efficiently the programming and the memory capacity, without relying on complicated hardware and software.

More specifically, the prior art sequence control system comprises a shunting register for temporarily shunting the content of a program counter, and a bias value register for storing bias values for input/output addresses of objects to be controlled. The content of the program counter is shunted to the shunting register and then changed in accordance with the instruction. The content of the shunting register is returned to the program counter to thereby permit a subroutine call. The content of the bias value register and an address part of the control instruction are added to produce an input/output address of the input/output unit and the content of the bias value register is changed to the instruction, thereby performing the same processing in respect of different objects to be controlled.

A primary object of this invention is to provide a novel method and system for controlling input/output operations which are suitable for fetching and processing data by way of a P I/O.

Another object of this invention is to effect fetching of data from an object process to be controlled and delivery of the result of the controlling operation or operation for control to the object process at a high rate.

Still another object of this invention is to effect a high rate fetching of data from the P I/O or delivery of the result of the operation from the P I/O each time a processor unit performs data processing by excluding the operation time for the P I/O per se from each sequence instruction execution time.

According to one feature of this invention, a buffer memory of the RAM (Random Access Memory) type is provided between the processor unit and the P I/O for effecting the input/output processing of data by way of the buffer memory.

According to another feature of this invention, writing of data into the RAM type buffer memory from the processor unit or the P I/O and reading of data from the RAM type buffer memory by the processor unit or the P I/O are not synchronized with each other.

According to still another feature of this invention, a random access is used for accessing the RAM type buffer memory by the processor unit while a scanning system is used for sequentially accessing the RAM type buffer memory by the P I/O.

The present invention will be apparent from the following detailed description taken in conjunction with the accompanying drawings, in which:

FIGS. 3 and 4 are time charts useful to explain operation of the system shown in FIG. 2.

Figure 1:
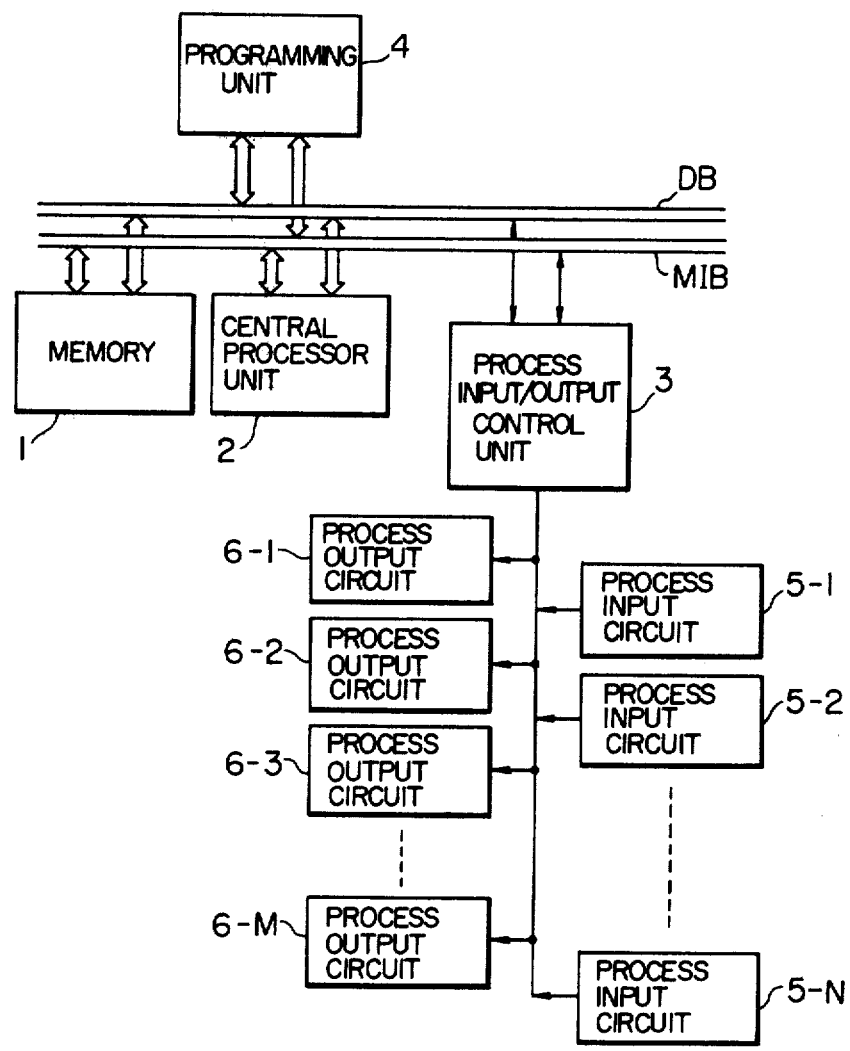
FIG. 1 is a schematic block diagram showing a system for controlling input/output.

Fundamental matters for better understanding of this invention will first be described with reference to FIG. 1 which shows schematically a typical PLC of the common bus type. Shown therein are a data bus DB and a memory interface bus MIB for transmission of a strobe signal STB, a write-in signal WRITE, a read-out signal READ and the like. A sequence data prepared by a programming unit 4 is written into a memory 1. The sequence data in the programming unit 4 includes various application programs prepared at the will of the operator. The programming unit 4 comprises an operator console and a CRT device for man-machine communication. A processor unit 2 (central processor unit; hereinafter referred to as CPU) fetches various input signals from a plurality of process input circuits 5-1 to 5-N and signals representative of process input points and undertakes to perform sequence operation processing of these signals while it delivers various output signals to a plurality of process output circuits 6-1 to 6-M and signals representative of process output points. The process input circuit 5 handles such signals as a digital input DI, an analog input AI and a pulse input PTI and the process output circuit 6 handles such signals as a digital output DO, an analog output AO and a pulse output PTO. A process input/output control unit or P I/O 3 (also referred to as PCE) is interposed between the processor unit and the process input and output circuits 5 and 6 to control data communication therebetween.

With this construction, when controlling a plurality of process input and output points in accordance with the sequence data set in the programming unit 4, it takes 100 μsec to 1.5 msec, for example, for effecting the operation processing in accordance with one sequence data (control instruction). More particularly, the processor unit 2 selects an intended process input point in accordance with a sequence data by way of the P I/O 3 which, in turn, delivers an answer-back signal (or interruption signal) indicating that an input data of the selected process input point is ready to be read out to the processor unit 2. After receiving the answer-back signal, the processor unit 2 reads the data of the process input point and performs a sequence operation processing, thus completing one instruction operation. A system using the answer-back signal for confirmation purpose is more popular than a system without using any answer-back signals.

The response of this PLC greatly depends on times required for operating the P I/O and the process input and output circuits 5 and 6. Therefore, the more the input/output operation of the P I/O becomes high rate, the more improved is the sequence instruction execution time. In the prior art system, each sequence instruction delivered from the processor unit 2 affects operations of the process input and output circuits 5 and 6. In other words, time required for operating the P I/O interferes with each sequence instruction execution time, thus degrading the response of the PLC to a large extent.

This invention contemplates a process control system which eliminates the disadvantages mentioned above and improves the processing rate. To this end, the process control system of this invention comprises a buffer memory of the RAM type interposed between the processor unit and the P I/O for the sake of separating the processor unit from the P I/O in terms of the data processing. Strictly, speaking a P I/O 3' as shown in FIG. 2 has a RAM type buffer memory 31 incorporated therein but this arrangement is simply referred to herein as a buffer memory provided between the P I/O and the processor unit.

Figure 2:
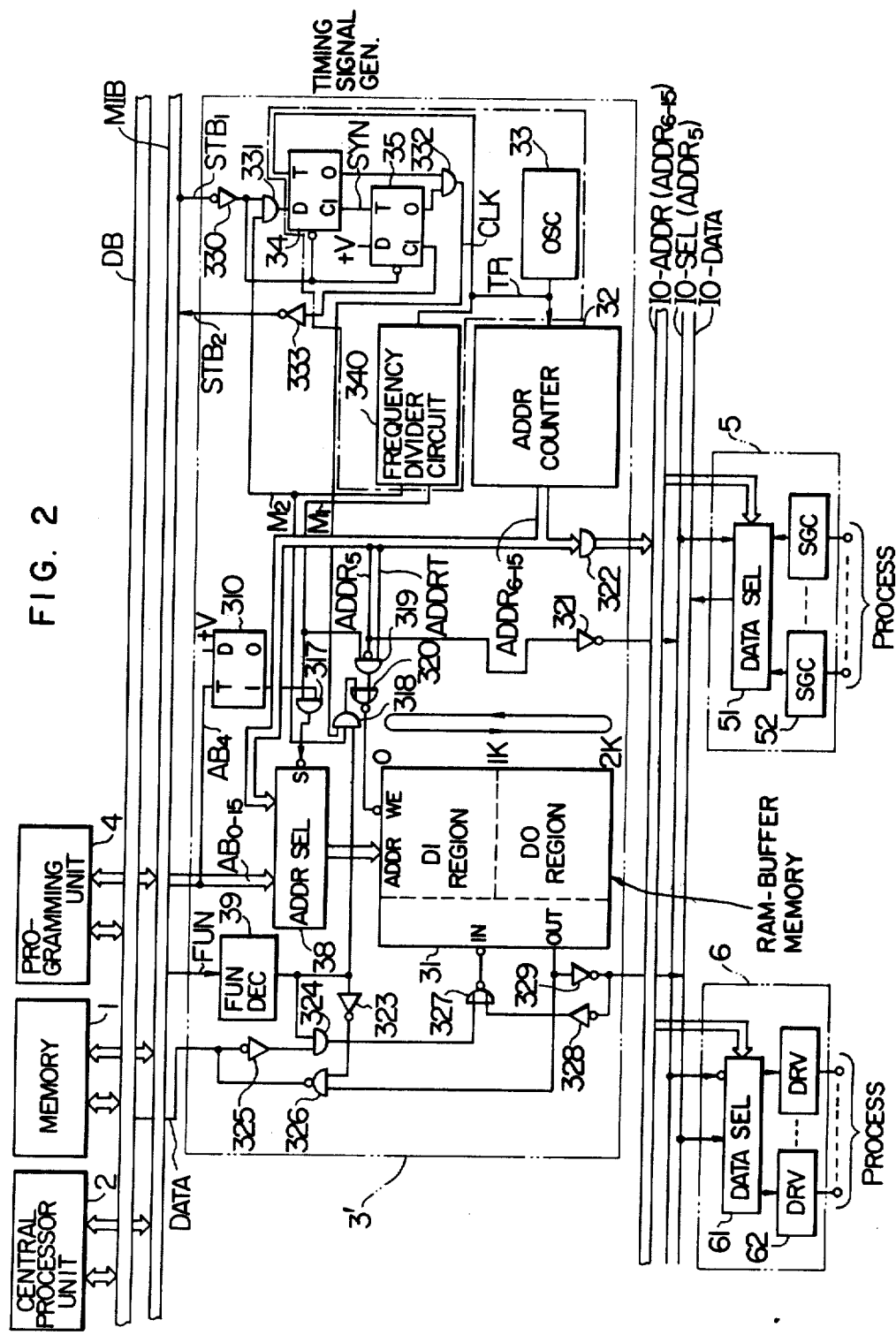
FIG. 2 is a circuit diagram, partly in block form, showing an input/output controlling system embodying the invention.

Turning now to FIG. 2, a preferred embodiment of the present invention will be described. The P I/O 3' shown in FIG. 2 comprises a random access memory (RAM) 31 of a capacity corresponding to the process input and output points, an address counting counter 32 (ADDR counter) which receives the output of an oscillator 33 operating in non-synchronized relationship with a processor unit (CPU)2 and generates a signal representative of each of the input/output points of the P I/O, a synchronizing circuit 34 (flip-flop circuit) for synchronizing the access from the processor unit 2 with the internal operation timing of the P I/O, a busy flip-flop circuit 35 for managing the access time of the processor unit 2, a frequency divider circuit 340 which receives clock pulses from the oscillator 33 and generates mode signals $M_1$ and $M_2$, the mode determined by the signal $M_1$ prescribing the use of the buffer memory 31 subject to the P I/O and the mode determined by the signal $M_2$ prescribing that subject to the processor unit, an address selecting circuit 38 (ADDR SEL) which selects and switches over address signals $AB_0$ to $AB_{15}$ to the memory interface and address signals $ADDR_6$ to $ADDR_{15}$ generated interiorly of the P I/O (the address associated with the $CPU_2$ is denoted by AB and the address associated with the P I/O is denoted by ADDR), a function selecting circuit 39 (FUN DEC) which selects a write-in function and a read-out function in accordance with a write-in command WRITE and a read-out command READ, a flip-flop circuit 310 for detecting the termination of writing-in of the output data, and a plurality of gate circuits 317 to 333. Remaining components shown in FIG. 2 are identical with those shown in FIG. 1.

The number of input points and the number of output points are herein assumed to be 1024 so that the capacity of the RAM 31 is 2 K. The buffer memory 31 shown in FIG. 2 has an input point region designated the DI region and an output point region designated the DO region. Symbols DI and DO correspond to digital input and output as set forth hereinbefore.

A process input circuit 5 comprises a data selector (DATA SEL) 51, and a receiving gate circuit (SGC) 52. A process output circuit 6 comprises a data selector 61, and a transmitting circuit (DRV) 62. The SGC 52 includes a plurality of circuit components which are the same as the DI input points in number and the DRV 62 includes a plurality of circuit components which are the same as the DO output points in number. The former number corresponds to the data capacity of the DI region of the buffer memory 31 and the latter member to the data capacity of the DO region. The P I/O 3' is connected with the process input and output circuits by way of a common bus which includes an address bus IO-ADDR, a select bus IO-SEL and a data bus IO-DATA. The arrangements of the input and output circuits and the common bus are the same as those of FIG. 1.

With this construction, the sequence control system operates as will be described with reference to time charts of FIGS. 3 and 4.

When starting the operation, prior to a series of operations, a programming unit 4 sequentially writes control data into addresses 1024 to 2047 of the process output information storing region, i.e., DO region of the RAM 31 in the P I/O 3' in a random access fashion. The address AB ($AB_0$ to $AB_{15}$) associated with the processor unit 2 is selectively converted by the address selecting circuit 38 (ADDR SEL) into an address signal for use in the RAM buffer memory 31. Upon completion of writing of data regarding all the addresses into the RAM buffer memory, an address $AB_4$ at the fourth bit causes the flip-flop circuit 310 to operate and the output signal of the address counter 32 including $ADDR_6$ to $ADDR_{15}$ is inputted to the address selecting circuit 38. ($AB_4$ represents the fourth bit signal of the 16-bit address signal. This type of designation also holds true for the designations of the other bit signals.) Time T required for one address operation by means of the address counter 32 (duration of signal ADDRT designated in FIG. 3 at (a)) is 2 μsec, for example, as shown in FIG. 3. The total time of the times required for the use of the buffer memory subject to the P I/O and that subject to the processor unit 2 is exemplarily allocated at addresses 1022 (Pt: 1022), 1023, ... in FIG. 3.

More particularly, in FIG. 3, the total time T is divided into time $t_1$ required for the P I/O to operate during the mode determined by the mode signal $M_1$ (FIG. 3, (b)) prescribing the use of the buffer memory subject to the P I/O and time $t_2$ required for the P I/O to operate during the mode determined by the mode signal $M_2$ (FIG. 3, (c)) wherein the processor unit is allowed to access the buffer memory. The address signals $ADDR_6$ to $ADDR_{15}$ are also applied, as a P I/O interface signal, to the process input and output circuits 5 and 6. Respective input/output points of the process input and output circuits 5 and 6 are scanned cyclically and sequentially over addresses ranging from 0 to 2047 at timing of 2 μsecond for one address, the scanning being not synchronized with the processor unit 2. Input data regarding plants are subjected to level conversion at the process input circuit 5 and stored in addresses corresponding to the input points of the DI regions of the RAM 31. On the other hand, output data written in the DO region of the RAM 31 is sequentially read out, subjected to level conversion at the process output circuit 6 (component) of the corresponding address, and thereafter sent to the plants sequentially. The above operation continues until the system stops or is turned off. In this manner, the P I/O and the processor unit access the RAM 31 at a timing of one address ADDRT in non-synchronized relationship in association with the respective input/output points. This is a basic feature of the present invention.

The operation of the RAM type buffer memory 31 will now be described.

Prior to starting the sequence control, a data set has been stored in the RAM buffer memory 31 by the programming unit 4. As the sequence control proceeds, the RAM buffer memory 31 is accessed by either the processor unit or a P I/O on the time division basis in accordance with various controllings or under the supervision of the object process to be controlled. The mode signals $M_1$ and $M_2$ from the frequency divider circuit 340 determine which access is effected. It is inevitable that each non-synchronized access to the RAM buffer 31 is effected on a time division basis as shown in FIG. 3 at (b) and (c).

The mode signal $M_2$ leads the mode signal $M_1$ and this holds true even at the starting of the operation. The access to the buffer memory in the overall operation including its starting will be described in more detail. The P I/O accesses the buffer memory as the input DI and output DO are scanned whereas the processor unit (CPU) accesses the buffer memory in a random fashion. The type of random access is important in connection with the relation between the processor unit (CPU) and the buffer memory. Namely, input and output points as required by the processor unit (CPU) are designated randomly but as requested by the processor unit (CPU). Although the process control and supervision associated with the P I/O are performed by scanning, those associated with the processor unit (CPU) are not restricted by the sequence of the scanning. This is of significance in the process control and contributes to a smooth processing in the processor unit (CPU). For example, in many applications, even when data representative of a specified input point is set into the buffer memory from the P I/O, the time at which the data of the specified input point is utilized is processed irrespective of the timing at which the data of this input point is set, and in this case, it is necessary that the processor unit (CPU) accesses the buffer memory randomly. Similarly, the processor unit (CPU) sets the output data randomly.

In accordance with the access to the buffer memory as described above, the function inherent to the CPU fulfills itself without interferring with the function inherent to the P I/O, or vice-versa.

The processor unit 2 operates to receive input data and deliver output data as will be described with reference to FIGS. 3 and 4. An access signal $STB_1$ from the processor unit 2 is synchronized with an internal timing pulse $TP_1$ in the P I/O 3′ by means of the synchronizing circuit 34 within a period $t_1$ during which the mode signal $M_2$ takes place, prescribing the access from the processor unit. An output signal SYN of the synchronizing circuit 34 triggers the busy flip-flop circuit 35. An output signal $STB_2$ of the busy flip-flop circuit 35, acting as the answer-back signal, is sent to the processor unit 2, indicating that the P I/O is ready to operate. The access operation of the processor unit 2 thus synchronized with the timing of the P I/O ensures that when the output D0 is directed to the data input (WRITE) operation, data DATA is written into addresses of the RAM 31 corresponding to the process output points designated by the signals $AB_0$ to $AB_{15}$ at the timing of a signal CLK. In the case of the data output (READ) operation, on the other hand, the data DATA stored in the RAM 31 and designated by the signals $AB_0$ to $AB_{15}$ is read out.

With refernce to FIG. 4 showing a time chart of the data input operation by means of the processor unit 2, when the mode signal $M_2$ and the access signal $STB_1$ from the processor unit are ANDed, the output of the gate 331 turns on the synchronizing flip-flop circuit 34 which, in turn, generates the synchronizing signal SYN (FIG. 4, (d)). At the same time, the answer-back signal $STB_2$ (FIG. 4, (e)) generated from the busy flip-flop circuit 35 is sent to the processor unit via the gate 333.

Concurrently, the gate 332 delivers out the clock signal CLK (FIG. 4, (i)) so that, as described above, data is written into addresses of the RAM 31 corresponding to process input/output points designated by the signals $AB_0$ to $AB_{15}$. Arrow denoted by WT in FIG. 4 explains this state. In particular, at the leading edge of the signal CLK, the data DATA is written (WRITE) into the addresses corresponding to the $AB_0$ to $AB_{15}$ and the writing of the data is completed at WE as shown in FIG. 4 at (j). When the access of the processor unit is completed and the $STB_1$ disappears, the SYN and $STB_2$ disappear. Data DATA is supplied to a terminal IN of the RAM 31 via the gates 325, 324 and 327 and written into the RAM 31. This write-in access (WRITE) is related to the timing signal $TP_1$ as shown in FIG. 4 and is essentially the same as the write-in access (WRITE) as shown in FIG. 3 at (d).

Next, read-out access (READ) of the processor unit as shown in FIG. 3 at (c) will be described. Designation of addresses in the RAM 31 by the signals $AB_0$ to $AB_{15}$ (FIG. 3, (d)), function of signal FUN indicative of "READ" in FIG. 3 applied to the function selecting circuit 39 which selects writing and reading of the processor unit, and the function of access signal $STB_1$ from the processor unit are similar to those in the above "WRITE" access. The relation between the "READ" access and the timing signal $TP_1$ is similar to that in the "WRITE" access shown in FIG. 4 and is not illustrated. As will be seen from an illustrative arrow indication in FIG. 3, under the condition that the "READ" access and designation of addresses by $AB_0$ to $AB_{15}$ are present, data in the RAM 31 is read out and the reading of the data is completed at RE. Needless to say, the "READ" access is carried out within the period $t_1$ during which the mode signal $M_2$ takes place.

The access from the P I/O is effected as will be described hereinafter briefly, with reference to section (e) in FIG. 3. As shown in FIG. 3 at (b), the access from the P I/O is allocated within the period $t_2$ during which the mode signal $M_1$ takes place. Within the period $t_2$ and under the condition that signal $ADDR_5$ from a bus line IO-SEL is ON, i.e., the process data input is ON, the writing of data into the RAM buffer memory is carried out and completed at WE. A separate bus line IO-DATA may be provided and the process data input may be supplied via the data input line of the P I/O. Alternatively, the bus line IO-DATA may be in common with the bus DB as in the case gathered from FIG. 3. Although it is not shown explicitly in FIG. 3, it may be taken that the IO-DATA bus is in common with DB. The employment of either a separate or a common bus raises no problem since different periods are allocated to the mode signals $M_1$ and $M_2$ as shown in FIG. 3 at (b) and (c). Similarly, bus lines IO-ADDR and IO-SEL may be in common with the bus MIB as in the case gathered from FIG. 3.

It is to be noted that in contrast to the access from the processor unit, the access from the P I/O is carried out by scanning. Where supervision for the state of process is desired, the state signal may be stored in the RAM buffer memory in an orderly manner at a predetermined period and the stored data may be read out of the RAM 31 at just the time when the utilization of the data by the processor unit is needed. Accordingly, while the data of the process is stored in the RAM buffer memory 31 each time the mode signal $M_1$ takes place as shown in FIG. 3 at (b), the access from the processor unit is not always performed each time the mode signal $M_2$ takes place as shown in FIG. 3 at (c). It simply means that the access from the processor unit is possible if the signal ADDRT is present, as will be gathered from section (d) in FIG. 3.

Delivery of the process data output from the P I/O is shown in FIG. 3 at (e). Once the RAM buffer memory is subjected to a "READ" access, the data is delivered out of the RAM cyclically each time the mode signal $M_1$ takes place and the "READ" access of corresponding addresses is completed at OE.

As described above, while for an input/output operation of data by means of the processor unit 2, the process data can be fetched by merely reading or writing the data of the desired addresses stored in the RAM 31, the results of the operation at the processor unit 2 can be written, as the output data, into addresses of the RAM 31 corresponding to the process output points. This means that each input/output operation of the processor unit 2 can be effected without interferring with the operations of the terminal units of the P I/O, i.e., the process input and output circuits 5 and 6, so that the apparent input/output operation time for the P I/O can be decreased. In effect, the process instruction execution time for the overall system is 2 μsec to 4 μsec which is considerably improved when compared with 100 μsec to 1.5 msec of the prior art system.

The buffer memory exemplified in the foregoing embodiment has the capacity corresponding to the total number of the input and output points with the advantage that the CPU may easily access the buffer memory, because the buffer memory covers all the locations to be designated corresponding to any input/output points. On the other hand, where some of the input/output points can be processed preferentially, it is sufficient to provide a buffer memory having a capacity in conformity with the preference and to provide for the CPU a software to assist the preferential processing. In this case, the direct communication, as in the prior art system, between the CPU and the P I/O may be employed for input/output points of lower preference. Conversely, the direct communication may be employed for input/output points of higher preference. The selection depends on the system requirements.

The signals DI and DO may be replaced by AI and AO signals. Furthermore, the data stored in the buffer memory, which were used for both the CPU and P I/O in the foregoing embodiment, may be used exclusively for either the CPU or the P I/O. For example, the buffer memory may act to check the processing of the CPU intermittently or to check the software of the CPU whereas the buffer memory may assist a P I/O having exclusive intelligence in its supervision for the input and output circuits as desired. Instead of being provided in the P I/O, the buffer memory may be provided on the common bus. The application of the invention is not limited to the sequence control system with the PLC but may be extended to general process control systems.

What we claim is:

1. A method for controlling input/output operations in a process wherein signals representative of the states of object processes to be controlled are fetched and are operated upon by a processor unit in accordance with a program stored in advance, and signals representative of the results of the operations are used to control the object processes, said method comprising the steps of:

storing sequentially the state signals of the object processes to be controlled in an input region of a buffer memory interposed between the processor unit and a process input/output unit, said buffer memory also having an output region;

reading out the state signals of the object processes stored in the buffer memory, causing the processor unit to effect a logical operation processing on the basis of said state signals and storing the results of the logical operation in the output region of the buffer memory, said processor unit accessing the buffer memory randomly; and causing the process input/output unit to read out signals representative of the results of the logical operation stored in the output region of the buffer memory so as to provide signals for controlling the object processes to be controlled, said process input/output unit accessing the buffer memory by scanning thereof in a predetermined sequence; whereby input/output communication of the state signals between the processor unit and the object processes to be controlled is effected by way of the buffer memory.

2. A method for controlling input/output operations in a process control according to claim 1, wherein the time for the processor unit to access the buffer memory and the time for the process input/output unit to access the buffer memory are predetermined, and accessible time zones are repeated at a period corresponding to the sum of both the times to allow the processor unit and the process input/output unit to access the buffer memory alternately.

3. A method for controlling input/output operations in a process control according to claim 2, wherein one period of the accessible time is determined on the basis of a timing signal which is generated interiorly of the process input/output unit and is independent of the timing for the processor unit.

4. A system for controlling input/output operations in a process control comprising:
   a processor unit for fetching signals representative of states of object processes to be controlled and for operating upon them in accordance with a program stored in advance;
   a process input/output unit for fetching the state signals of the object processes to be controlled and for reading out results of the operation of the processor unit so as to provide output signals for controlling the object processes to be controlled;
   a random access buffer memory connected between the processor unit and the process input/output unit;
   timing signal generator means connected to said random access buffer memory for determining a first timing during which the processor unit may access the random access buffer memory and a second timing for the process input/output unit to access the random access buffer memory; and
   function selecting means connected to said processor unit for sending a selecting signal to the random access buffer memory in accordance with a write-in or read-out instruction;
   whereby the access to the random access buffer memory from the processor unit and that from the process input/output unit can be performed independent of each other.

5. A system for controlling input/output operations in a process control according to claim 4, wherein said timing signal generator means includes a signal generator circuit for producing first and second signals which alternate at a predetermined period corresponding to the sum of the access time to the random access buffer memory from the processor unit and from the process input/output unit.

6. A system for controlling input/output operations in a process control according to claim 4, wherein said random access buffer memory comprises, in respect of at least one object process to be controlled, an input data region for storing the state signal of the object process by way of the process input/output unit, and a controlled output data region for storing the result of the operation of the processor unit.

7. A system for controlling input/ouput operations in a process control according to claim 5, wherein said timing signal generator means further includes address counter means responsive to said signal generator circuit for generating sequential memory addresses by which said process input/output unit may access said random access buffer memory, and further including address selection means connected to said address counter means and said processor being responsive to said first and second signals for applying either said sequential memory address or random addresses from said processor to said random access buffer memory.

8. A system for controlling input/output operations in a process control according to claim 7, wherein said signal generator circuit includes a timing pulse generator for generating timing pulses without regard to the operation timing of said processor unit and frequency divider means responsive to said timing pulses for generating said first and second signals.

9. A system for controlling input/output operations in a process control according to claim 8, further including logic control means responsive to said first and second signals for controlling said address selecting means to permit alternate accessing of said random access buffer memory by said processor unit and said process input/output unit.

10. A system for controlling input/output operations in a process control according to claim 9, wherein said timing signal generator means includes means responsive to a strobe signal generated by said processor unit for generating a clock signal, said logic control means including means responsive to said clock signal during the buffer memory access time allocated to said processor unit by one of said first and second signals for applying the selecting signal from said function selecting means to said buffer memory.

11. A system for controlling input/output operations in a process control comprising:
   a processor unit for fetching signals representative of states of object processes to be controlled and for operating upon them in accordance with a program stored in advance;
   a process input/output unit for fetching the state signals of the object processes to be controlled and for reading out results of the operation of the processor unit so as to provide output signals for controlling the object processes to be controlled;
   a random access buffer memory connected between the processor unit and the process input/output unit, first means for storing the state signals of the object processes in said buffer memory and then inputting said signals to said processor unit, and second means for storing the signals produced as the results of the operation of the processor unit on the basis of the inputted state signals in said buffer memory and then outputting said signals to the object processes to be controlled through said process input/output unit; and
   timing means for controlling said first and second means to operate alternately in successive periods of predetermined duration.

12. A system for controlling input/output operations in a process control according to claim 11, further including control means for controlling said first and second means to effect access by said processor unit to said buffer memory asynchronously with access by said process input/output unit to said buffer memory.

* * * * *